United States Patent
Sata et al.

(10) Patent No.: US 7,132,957 B2
(45) Date of Patent: Nov. 7, 2006

(54) REMOTE CONTROL TRANSMITTER AND TRANSMITTING AND RECEIVING DEVICE USING THE SAME

(75) Inventors: Norifumi Sata, Takarazuka (JP); Tamotsu Yamamoto, Ashiya (JP); Noriaki Matsui, Tsuruga (JP); Takaya Nakamura, Tsuruga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 111 days.

(21) Appl. No.: 10/890,623

(22) Filed: Jul. 14, 2004

(65) Prior Publication Data

US 2005/0030434 A1    Feb. 10, 2005

(30) Foreign Application Priority Data

Jul. 23, 2003    (JP) .............................. 2003-278070

(51) Int. Cl.
*G08C 19/00*    (2006.01)
*H03K 11/00*    (2006.01)
*G09G 5/08*    (2006.01)

(52) U.S. Cl. .................... 340/825.72; 345/161; 341/20

(58) Field of Classification Search ........... 340/825.72, 340/825.69; 341/176, 22, 33, 20, 35, 5; 386/68, 386/69, 83; 348/734; 345/161, 15, 174
See application file for complete search history.

(56) References Cited

U.S. PATENT DOCUMENTS

| | | | | |
|---|---|---|---|---|
| 4,736,191 A | * | 4/1988 | Matzke et al. | ................. 341/20 |
| 4,866,542 A | * | 9/1989 | Shimada et al. | ............... 386/69 |
| 5,508,703 A | * | 4/1996 | Okamura et al. | ........... 341/176 |
| 5,689,285 A | * | 11/1997 | Asher | ......................... 345/161 |

FOREIGN PATENT DOCUMENTS

JP    2001-320789 A    11/2001

\* cited by examiner

*Primary Examiner*—Wendy R. Garber
*Assistant Examiner*—William Bangachon

(74) *Attorney, Agent, or Firm*—RatnerPrestia

(57) ABSTRACT

A substantially ring shaped resistor unit and an conductor unit with a certain space therebetween are provided under an operating unit having a substantially disc shape or a substantially ring shape. When an operating unit is depressed, the resistor unit and the conductor unit are contacted with each other at a position at which the depression is provided. Based on the contact, a controlling part detects the position at which the depression is provided, and a transmitting part transmits a remote control signal corresponding to the position at which the depression is provided.

9 Claims, 4 Drawing Sheets

REMOTE CONTROL TRANSMITTER AND TRANSMITTING AND RECEIVING DEVICE USING THE SAME

BACKGROUND OF THE INVENTION

1. Field of the Invention

The present invention relates to a remote control transmitter used for controlling remotely various electronic devices such as TV, video recorder, or air conditioner and so on. The present invention also relates to a transmitting and receiving device using the remote control transmitter.

2. Description of the Related Art

Recently, various electronic devices such as TV, video recorder, or air conditioner have become more functional and diversified. Therefore, remote control transmitters for remotely controlling such devices are also required easy operation and diversified multi-functional control.

Such a conventional remote control transmitter is described with reference to FIG. 4.

FIG. 4 is a perspective view illustrating the conventional remote control transmitter. In FIG. 4, a plurality of operation keys 2A and 2B made of insulating resin are disposed on the upper face of a housing 1 made of insulating resin. The upper parts of the operation keys 2A and 2B are protruded from the upper surface of the housing 1 so as to be moved vertically.

In the housing 1, a wiring board (not shown) having a plurality of conductive patterns on its upper and lower faces is installed. On the upper face of this wiring board, a plurality of switch contacts (not shown) for performing electrical connection and disconnection by depressing the operation keys 2A or 2B are formed.

Furthermore, electronic components (not shown) such as a microcomputer or a light-emitting diode are mounted on this wiring board. These electronic components are electrically connected to the plurality of switch contacts. In this way, a controlling part 3 for inputting and outputting certain electric signals and a transmitting part 4 for transmitting a remote control signal in response to this electric signal are formed, so that the remote control transmitter is constructed.

As the configuration discussed above, when this remote control transmitter is directed to an electronic device (e.g., TV, video recorder) and a key of the plurality of operation keys 2A (e.g., key for channel selection or volume control) is depressed, a switch contact under this depressed operation key performs electrical connection or disconnection. Then, the controlling part 3 detects this depressed operation key, and a corresponding infrared remote control signal is transmitted from the transmitting part 4 to the electronic device.

By receiving this remote control signal at a reception part (not shown) of the electronic device, channel selection or volume control of the electronic device is executed.

Besides, the operation keys 2B are used for selecting operation using a menu screen, for example. That is, a display part (not shown) of the electronic device (e.g., cathode-ray tube, liquid crystal display element) displays a plurality of menus such as image quality adjustment. In this state, when one of the plurality of operation keys 2B is depressed, then a cursor (not shown) or the like displayed on the display part is moved in a direction corresponding to the depressed operation key. Menu selection or menu determination is executed by such operation described above, so that adjustment of image quality or the like is remotely controlled.

The conventional remote control transmitter has been configured described above.

Japanese Laid-Open Publication No. 2001-320789 is known as a prior art document related to this invention.

However, according to the above conventional remote control transmitter, in order to provide remote control that adapts to electronic devices having higher performance and diversified functions, a great number of operation keys having different shapes and displays corresponding to various functions have been required. In addition, a great number of switch contacts corresponding to the each functions have been also required. Therefore, the number of components increases and operation of the conventional remote control transmitter becomes more complicated.

SUMMARY OF THE INVENTION

A remote control transmitter of the present invention has the following elements:

a wiring board where electronic components for generating a remote control signal are mounted;

a housing for installing the wiring board;

an operating unit disposed at an upper face of the housing, an arbitrary portion of an outer part of the operating unit can be moved in a depressed direction;

a resistor unit and a conductor unit provided under the operating unit in parallel and opposed to each other with a certain space therebetween;

a controlling part electrically connected to the resistor unit and the conductor unit; and a transmitting part for transmitting a remote control signal in response to an instruction from the controlling part.

The remote control transmitter is structured such that, when the operating unit is depressed, the resistor unit and the conductor unit are contacted with each other at a position at which the depression is provided, and the controlling part electrically detects the position at which the resistor unit and the conductor unit are contacted with each other to instruct the transmitting part to transmit a remote control signal corresponding to the detected position.

According to the structure as described above, the resistor unit and the conductor unit having a plurality of contact positions or continuous contact positions are contacted to each other by depressing the operating unit. The device can be remotely controlled by using a remote control signal corresponding to the contact positions. Thus, the easy-operated remote control transmitter having a small number of components and multi-functions can be obtained.

Further, the remote control transmitter of the present invention has a depressible unit at the center part of the operating unit. Thus, menu selection can be performed by the operating unit having a substantially ring shape or the like, and menu determination can be performed by the depressible unit, for example. The operation of such members having different shapes allows the remote control transmitter to be operated in an easier manner.

Furthermore, the transmitting and receiving device of the present invention is structured so as to transmit a remote control signal by the operation of the remote control transmitter and receive the remote control signal by a reception part of a receiver to control a display part. Thus, the easy-operated and multi-functional remote control transmitter can be obtained.

DESCRIPTION OF THE PREFERED EMBODIMENT

Hereinafter, embodiment of the present invention is described with reference to FIG. 1 to FIG. 3.

Embodiment

Figure 1:
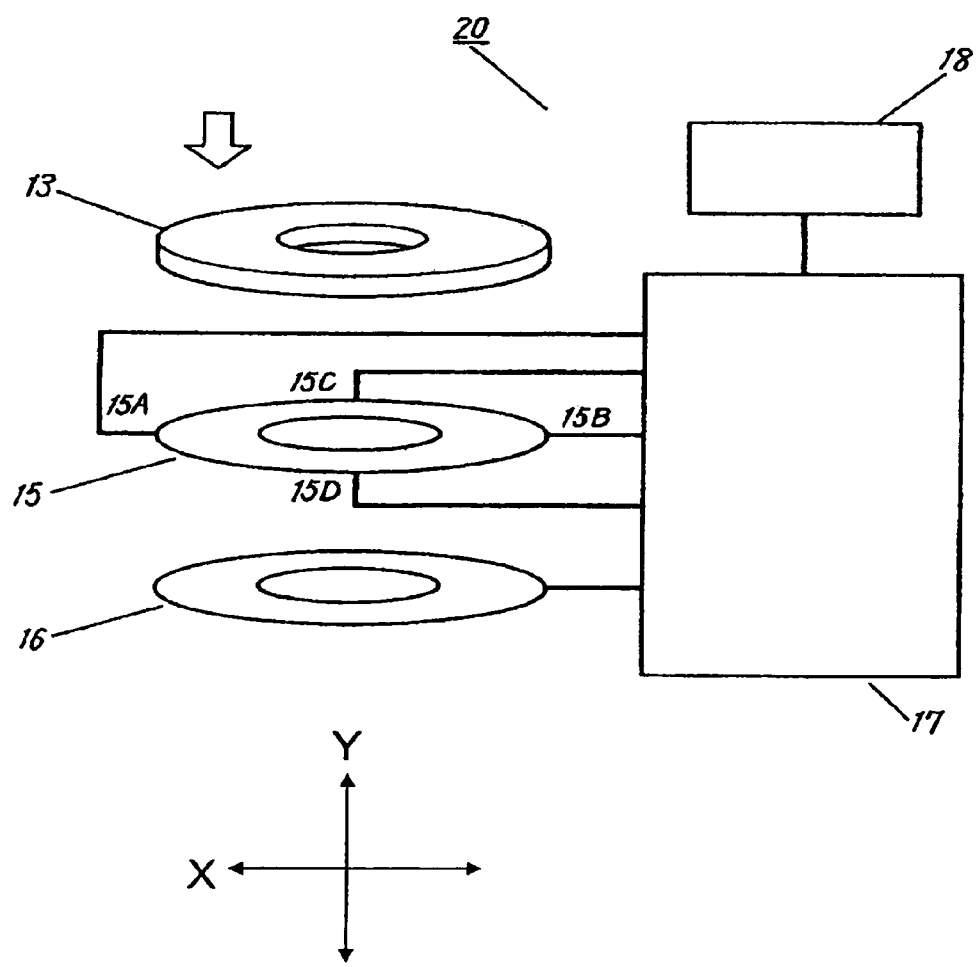
FIG. 1 illustrates a configuration of a remote control transmitter of one exemplary embodiment of the present invention.
Figure 2:
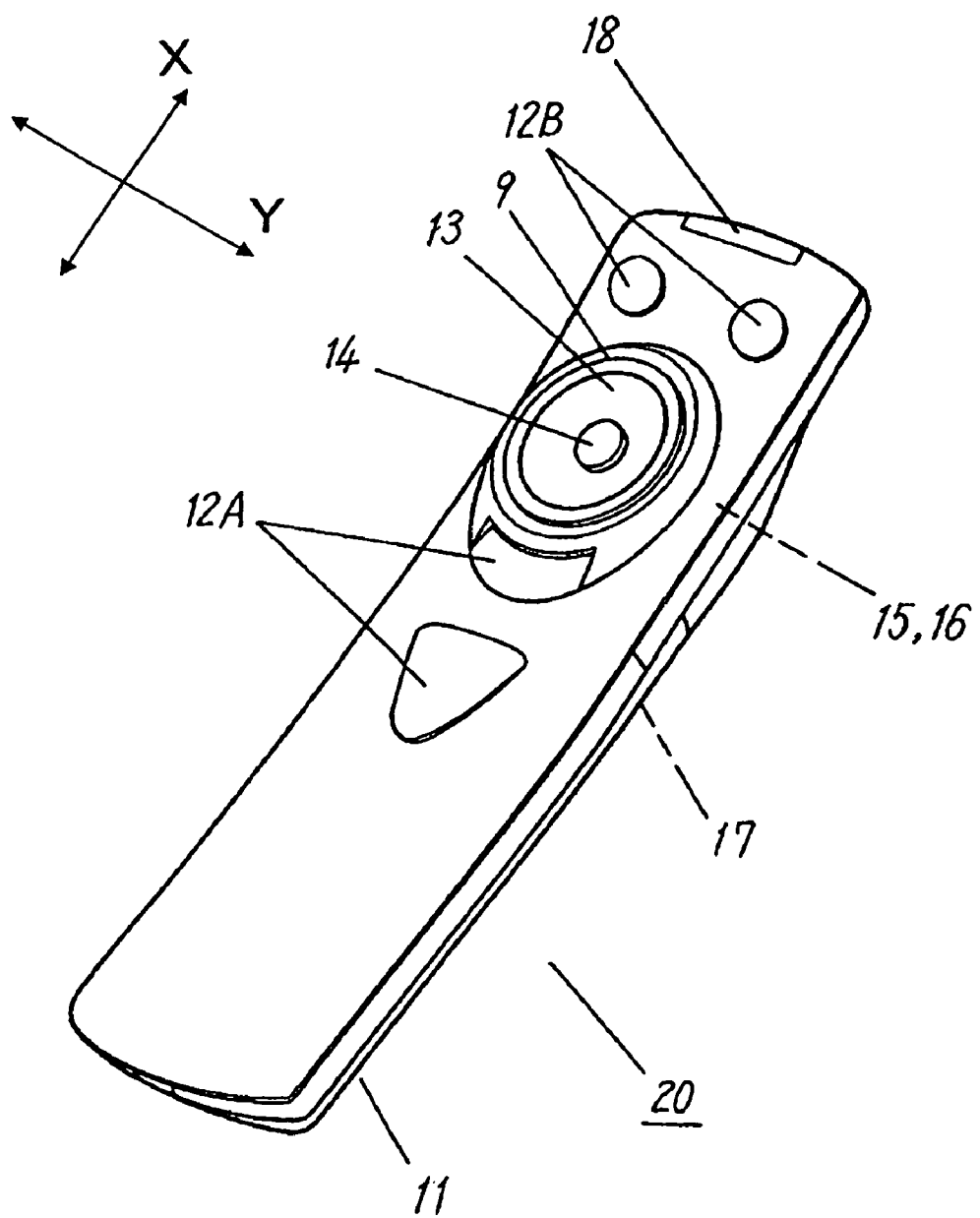
FIG. 2 is a perspective view of the remote control transmitter of one exemplary embodiment of the present invention.

FIG. 1 illustrates a configuration of a remote control transmitter, and FIG. 2 is a perspective view of the remote control transmitter in one embodiment of the present invention. As shown in FIG. 2, insulating resin-made operation keys 12A and 12B are disposed on the upper face of a housing 11 made of insulating resin, and the upper parts thereof are protruded from the upper surface of the housing 11 so as to be moved vertically.

A substantially ring shaped operating unit 13 made of insulating resin is provided on the upper face of the housing 11 so as to be tilted. That is, the operating unit 13 is configured that by depressing an arbitrary portion of the ring shaped part as an outer part of the operating unit 13, such depressed portion is movable in the depressed direction. At the center part of the operating unit 13A, depressible unit 14 made of insulating resin is provided so as to be moved vertically.

As shown in FIG. 1, a substantially ring shaped resistor unit 15 made of carbon or the like is disposed under the operating unit 13. That is, the resistor unit 15 confronted with and provided under the operating unit 13 in substantially parallel. The resistor unit 15 is formed at the lower face of a film sheet such as polyethylene terephthalate (not shown), for example.

In the housing 11, a wiring board (not shown) having a plurality of conductive patterns on its upper and lower faces is installed. On the upper face of the wiring board, a plurality of switch contacts (not shown) for performing electrical connection and disconnection by depressing the operation key 12A, 12B or the depressible unit 14 are formed. Further, on the upper face of wiring board placed under the operating unit 13, an substantially ring shaped conductor unit 16 made of copper alloy or the like is formed with opposing to the resistor unit 15 with a certain space therebetween.

Further, electronic components (not shown) such as a microcomputer or a light-emitting diode are mounted on this wiring board. These electronic components are electrically connected to the plurality of switch contacts, the resistor unit 15, and the conductor unit 16. In this way, a controlling part 17 for inputting and outputting electric signals to control or process is formed, and a transmitting part 18 for generating and transmitting a remote control signal in response to the electric signal from this controlling part 17 is formed.

Specifically, in the remote control transmitter of the present embodiment, the resistor unit 15 having electric resistance and the conductor unit 16 whose electric resistance can be neglected are electrically connected to the controlling part 17, as shown in FIG. 1. In the connection between the resistor unit 15 and the controlling part 17, a pair of outer part 15A and 15B in the direction "X" of the resistor unit 15 is electrically connected to the controlling part 17. Also, a pair of outer part 15C and 15D in the direction "Y" that is orthogonal to the direction "X" is electrically connected to the controlling part 17.

The foregoing structure forms the remote control transmitter 20 of the present embodiment.

Figure 3:
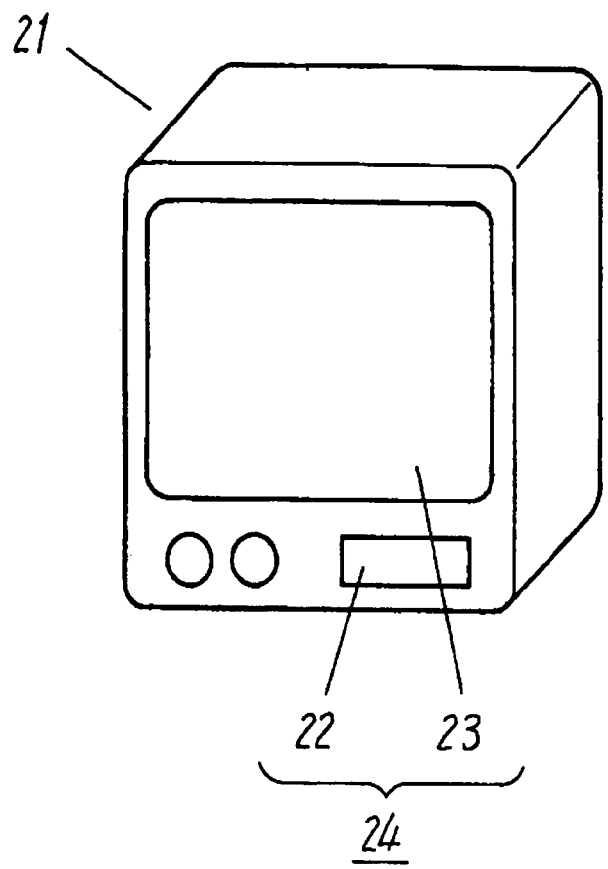
FIG. 3 is a perspective view of a transmitting and receiving device of one exemplary embodiment of the present invention.
Figure 3:
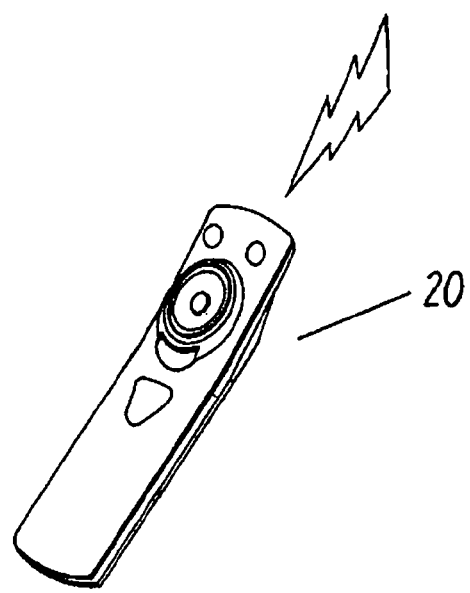
Figure 4:
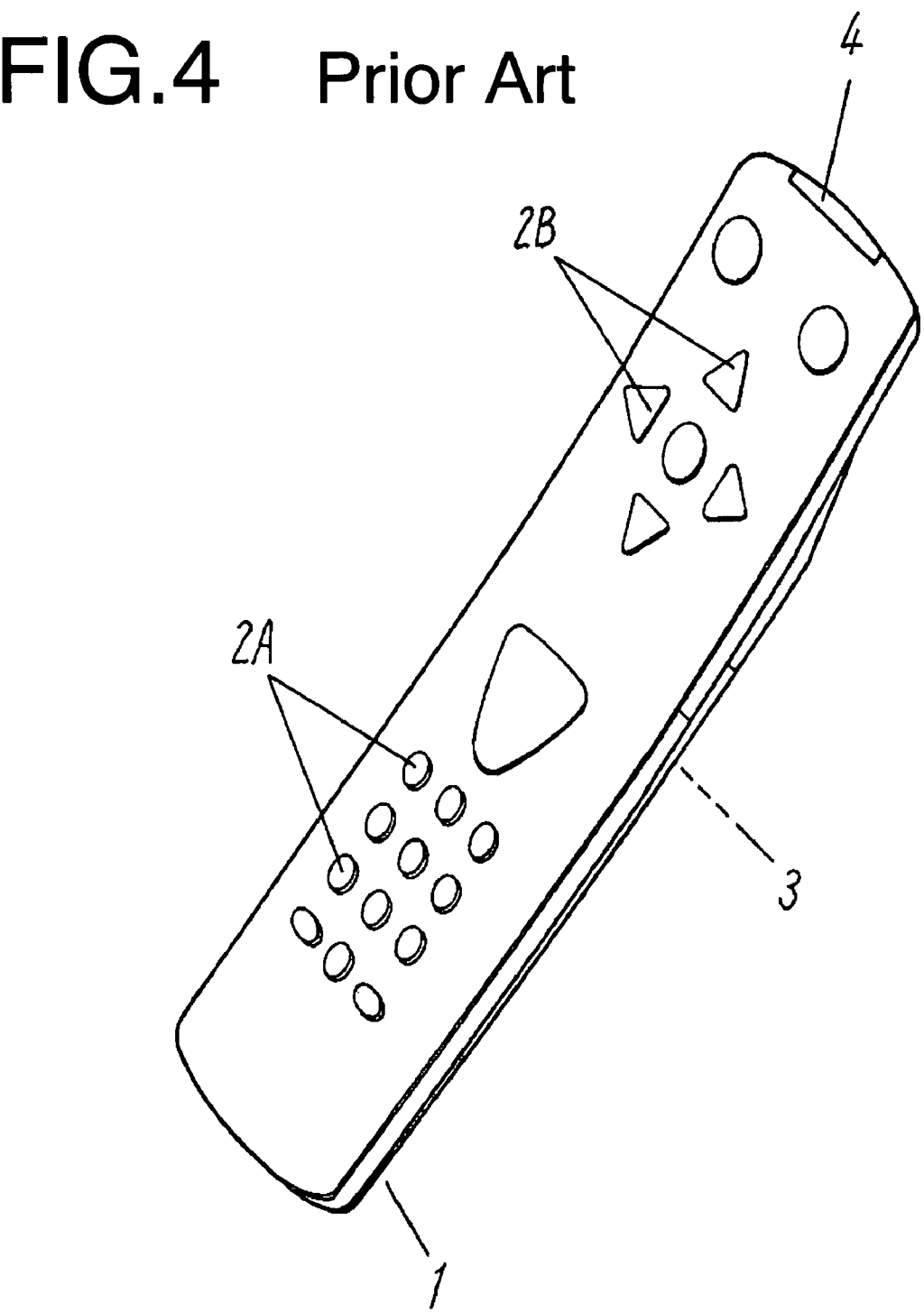
FIG. 4 is a perspective view illustrating a conventional remote control transmitter.

FIG. 3 is a perspective view illustrating an example of the transmitting and receiving device of the present invention. As shown in FIG. 3, an electronic device 21 (e.g., TV) includes a receiver 24 that has a reception part 22 for receiving a remote control signal and a display part 23 (e.g., cathode-ray tube, liquid crystal display element). The transmitting and receiving device of the present invention is formed of the receiver 24 and the remote control transmitter 20 described above.

Operations of the remote control transmitter, and the transmitting and receiving device of the present invention will be described in the following.

When a user operates the ring shaped operating unit 13 of the remote control transmitter by depressing a portion of ring shaped part, the operating unit 13 is tilted in the direction along which the portion is depressed. As a result, the lower face of the operating unit 13 depresses the resistor unit 15, thus the resistor unit 15 is contacted with the conductor unit 16 substantially at the position at which the portion is depressed.

Then, the controlling part 17 applies a voltage between the outer part 15A and 15B of the resistor unit 15 in the direction "X" and measures the output voltage outputted from the conductor unit 16 by applying the voltage. Based on this output voltage from the conductor unit 16, the controlling part 17 detects a depressed position along the direction "X". That is, when the resistor unit 15 is contacted with the conductor unit 16, a resistance value between the outer part 15A and 15B of the resistor unit 15 is divided into resistance from the contact point to the outer part 15A and resistance from the contact point to the outer part 15B. As a result, in response to the voltage applied between the outer part 15A and 15B, a divided voltage corresponding to the contacted position is outputted from the conductor unit 16. By using the principle as described above, the controlling part 17 detects the position, at which the depression is provided in the direction "X".

Next, the controlling part 17 applies a voltage between the outer part 15C and 15D of the resistor unit 15 in the direction "Y" and measures the output voltage outputted from the conductor unit 16 by applying the voltage. Using this output voltage from the conductor unit 16, the controlling part 17 detects a depressed position along the direction "Y" at which the depression is provided, based on the same principle in the direction "X".

By using the detected information regarding the positions at which depression is provided in the direction "X" and the direction "Y", the controlling part 17 detects the position at which the operating unit 13 is depressed.

Here, one example will be described in the case that the direction "X" is a front and rear direction, and the direction "Y" is a left and right direction. When the user depresses the front left portion 9 of the operating unit 13 as shown in FIG. 2, the controlling part 17 firstly detects that a front left or front right portion from the center of the operating unit 13 is depressed, based on the voltage applied in the direction "X". Next, the controlling part 17 detects that a front left or rear left portion from the center of the operating unit 13 is depressed, based on the voltage applied in the direction "Y". By using the detected information that is the front portion regarding direction "X" and is the left portion regarding direction "Y", the controlling part 17 detects that the front left portion 9 of the operating unit 13 is depressed.

In this case, by associating channel numbers for channel selection with positions on the periphery of the operating unit 13, for example displaying the numbers of "1" to "12" on the operating unit 13 like a clock, a channel designated by the user can be detected. In other words, in the case that the front left portion 9 of the operating unit 13 corresponds to the channel number "11" for example, when the front left section 9 is depressed, the controlling part 17 detects that the channel number "11" is designated.

Based on the detected designation from the user, the controlling part 17 instructs the transmitting part 18 to transmit a corresponding remote control signal. In the case as described above example, an electric signal corresponding to the channel "11" is outputted from the controlling part 17 to the transmitting part 18. Then, the remote control signal for the channel "11" corresponding to the front left portion 9, at which the depression is provided, is transmitted from the transmitting part 18 to the electronic device 21.

And by being received this remote control signal by the reception part 22, the electronic device 21 is switched the current channel to the channel "11".

The remote control transmitter, and the transmitting and receiving device of the present invention also operate to select a menu (e.g., program guide listing, weather forecast) displayed on the display part 23 of the electronic device 21, for example.

In this case, while the menu is being displayed, the user firstly depresses the operation key 12B, for example. Then, the controlling part 17 detects instruction to switch functions of the operating unit 13, thereby switching the function of the operating unit 13. In this example, the controlling part 17 switches the function to the function of menu selection. Thereafter, when the user depresses a portion of the operating unit 13, the operating unit 13 is tilted as described above and the resistor unit 15 is contacted with the conductor unit 16. By this operation, the controlling part 17 detects the depressed position based on the output voltage, which corresponds to the depressed position and outputted from the conductor unit 16. Then, the controlling part 17 outputs an electric signal corresponding to the detected depressed position to the transmitting part 18. Thereafter, the transmitting part 18 transmits a remote control signal corresponding to the position at which the depression is provided.

In this way, a cursor (not shown) or the like displayed on the display part 23 is moved over a plurality of menus in a direction along which the depression of the operating unit 13 is provided, thereby providing the menu selection.

When the cursor reaches a desired menu and the user depresses the depressible unit 14 at the center of the operating unit 13, the controlling part 17 detects this depressing operation and instructs the transmitting part 18 to transmit a remote control signal corresponding to the desired menu. The transmitting part 18 transmits the remote control signal corresponding to this instruction, so that the menu is determined, for example.

As described above, the remote control transmitter of the present invention includes the operating unit 13 that can be tilted in any direction. And by being depressed this operating unit 13 by the user, the resistor unit 15 is contacted with the conductor unit 16 at the position at which the depression is provided. Then, the controlling part 17 judges the instruction from the user based on the divided voltage detected at this contact position of the resistor unit 15 and controls the transmitting part 18 so as to transmit a corresponding remote control signal. In this way, the remote control transmitter of the present invention transmits the remote control signal which corresponds to a portion where the user depressed against the operating unit 13 to the reception part 22 of the electronic device 21 (e.g., TV), whereby the user can select a channel or a menu. Thus, the remote control transmitter of the present invention is structured such that various functions can be remotely controlled only by the operating unit 13 without a great number of operation keys.

Accordingly, the present invention can provide an easy-operated remote control transmitter having a small number of components and being available diversified multi-functional control, and a transmitting and receiving device using the remote control transmitter. Moreover, the operating unit 13, the resistor unit 15 and the conductor unit 16 can be easily formed a thin plate-like shape. Thus, the use of such thin plate-like members allows the remote control transmitter to have a thinner shape and thus the remote control transmitter can be applied as a card-like remote control transmitter.

Besides, the depressible unit 14 provided at the center of the operating unit 13 allows menu selection to be performed by the substantially ring shaped operating unit 13 and also allows menu determination to be performed by the depressible unit 14. The operation of such units having different forms allows the remote control transmitter to be operated in an easier manner.

According to the present embodiment described above, a remote control signal is transmitted whenever the upper face of the substantially ring shaped operating unit 13 is depressed. However, the present invention may be provided in a different manner. The operating unit 13 may be continuously tilted by tracing the outer portion of the upper face of the operating unit 13 using a finger or the like for moving a cursor or the like according to the traced distance.

Also, according to the present embodiment, the operating unit 13 has a substantially ring-like shape and disposes the depressible unit 14 at the center thereof. However, the operating unit 13 may have a substantially disc-like shape, and a menu may be selected by this operating unit 13 and determined by depressing the operation key 12A or the like. The operating unit 13 may have other shape such as an elliptic or a polygonal shape that is other than the circular one such as a substantially ring-like or a substantially disc-like one.

Also, the resistor unit 15 and the conductor unit 16 may be provided in an inverse manner in which the conductor unit 16 is disposed at an upper position and the resistor 15 is disposed at a lower position.

As described above, the present invention can realize the remote control transmitter being available diversified multi-functions with easy operation, and a transmitting and receiving device using the remote control transmitter. The remote control transmitter and the transmitting and receiving device are useful for remotely controlling various electronic devices such as TV, video recorder, or air conditioner, for example.

What is claimed is:

1. A remote control transmitter, comprising:
a wiring board where electronic components for generating a remote control signal are mounted;
a housing for installing the wiring board;
an operating unit disposed at an upper face of the housing, an arbitrary portion of an outer part of the operating unit can be moved in a depressed direction;
a resistor unit having a changing amount of resistance according to a position along a and a conductor unit both provided under the operating unit, said resistor unit and said conductor unit opposed to each other with a space therebetween, said resistor unit and said conductor unit contactable with each other at said position along said path;

a controlling part for measuring a voltage output by the conductor unit depending upon said position where said resistor unit and said conductor unit are contacted; and a transmitting part for transmitting one of a plurality of remote control signals in response to said voltage.

2. The remote control transmitter according to claim 1, wherein the operating unit has a substantially disc shape or a substantially ring shape;

the resistor unit has a substantially ring shape; and the conductor unit has a substantially ring shape.

3. The remote control transmitter according to claim 2, wherein the operating unit is provided at the upper face of the housing so as to be tilted in a direction along which the operating unit is depressed.

4. The remote control transmitter according to claim 3, wherein the controlling part is electrically connected to a pair of outer parts provided in one diameter direction of the resistor unit and another pair of outer parts provided in another diameter direction substantially orthogonal to the one diameter direction; and when the resistor unit is contacted with the conductor unit, the controlling part detects the position at which the resistor unit is contacted with the conductor unit based on resistance between the conductor unit and each of the electrically connected outer parts of the resistor unit.

5. The remote control transmitter according to claim 4, wherein the controlling part applies a voltage to the pair of outer parts provided in one diameter direction of the resistor unit to measure a voltage outputted from the conductor unit, and also applies a voltage to the another pair of outer parts provided in another diameter direction substantially orthogonal to the one diameter direction of the resistor unit to measure a voltage outputted from the conductor unit and, when the resistor unit is contacted with the conductor unit, the controlling part detects the position at which the resistor unit is contacted with the conductor unit based on the measured voltages from the conductor unit.

6. The remote control transmitter according to claim 5, wherein the resistor unit is confronted with and provided under the operating unit; and the conductor unit is confronted with and provided under the resistor unit.

7. The remote control transmitter according to claim 5, wherein the conductor unit is confronted with and provided under the operating unit; and the resistor unit is confronted with and provided under the conductor unit.

8. The remote control transmitter according to claim 1, wherein a depressible unit is provided at a center part of the operating unit.

9. A transmitting and receiving device, comprising:

the remote control transmitter according to claim 1 and a receiver having a reception part and a display part, wherein, the remote control transmitter transmits a remote control signal by operating the operating unit, and wherein the reception part of the receiver receives the remote control signal, and controls the display part based on the received remote control signal.

* * * * *

UNITED STATES PATENT AND TRADEMARK OFFICE
CERTIFICATE OF CORRECTION

| | | |
|---|---|---|
| PATENT NO. | : 7,132,957 B2 | Page 1 of 1 |
| APPLICATION NO. | : 10/890623 | |
| DATED | : November 7, 2006 | |
| INVENTOR(S) | : Norifumi Sata et al. | |

It is certified that error appears in the above-identified patent and that said Letters Patent is hereby corrected as shown below:

In column 6, line 66; "along a and a conductor" should read --along a path and a conductor--.

Signed and Sealed this

Fifteenth Day of May, 2007

JON W. DUDAS
*Director of the United States Patent and Trademark Office*